United States Patent
Hu et al.

(10) Patent No.: US 8,660,106 B2
(45) Date of Patent: Feb. 25, 2014

(54) OPTIMIZING CODE UTILIZATION REGARDING A SECONDARY SCRAMBLING CODE

(75) Inventors: Rong Hu, Beijing (CN); Muhammad Kazmi, Bromma (SE); Arne Simonsson, Gammelstad (SE); Gunnar Bark, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1048 days.

(21) Appl. No.: 12/298,003

(22) PCT Filed: Apr. 21, 2006

(86) PCT No.: PCT/SE2006/050082
§ 371 (c)(1),
(2), (4) Date: Jan. 29, 2009

(87) PCT Pub. No.: WO2007/123448
PCT Pub. Date: Nov. 1, 2007

(65) Prior Publication Data
US 2009/0154441 A1 Jun. 18, 2009

(51) Int. Cl.
*H04B 7/216* (2006.01)
*H04B 7/00* (2006.01)

(52) U.S. Cl.
USPC ............................ 370/342; 370/335; 370/310

(58) Field of Classification Search
USPC .......................................................... 370/342
See application file for complete search history.

(56) References Cited

U.S. PATENT DOCUMENTS

| 7,088,671 B1 * | 8/2006 | Monsen | 370/203 |
| 7,702,343 B2 * | 4/2010 | Manohar | 455/502 |
| 2004/0005890 A1 * | 1/2004 | Holma et al. | 455/424 |

OTHER PUBLICATIONS

Staehle, D.; "On the Code and Soft Capacity of the UMTS FDD Downlink and the Capacity Increase by Using a Secondary Scrambling Code"; PUB-Personal, Indoor and Mobile Radio Communications, 2005: PIMRC 2005; IEEE 16$^{th}$ Natioanal Symposium on Berlin, Germany Sep. 11-14, 2005.

* cited by examiner

*Primary Examiner* — Shripal Khajuria

(57) ABSTRACT

The present invention relates to a method, arrangement and computer-readable medium for optimizing code utilization in a code division multiple access (CDMA) communication network comprising a first communication network entity (10), a second communication network entity (15) connected to said first communication network entity over a communication interface and one or more user equipments (18) transmitting data using a scrambling code to said second communication network entity (15) over a radio interface on an uplink channel (14). Firstly, in what type of radio environment said one or more user equipments are is identified. Secondly, a traffic activity over the radio interface is measured. Thereafter, when and how to use a secondary scrambling code is determined based on the type of radio environment and traffic activity.

20 Claims, 2 Drawing Sheets ial Channel
OPTIMIZING CODE UTILIZATION REGARDING A SECONDARY SCRAMBLING CODE

TECHNICAL FIELD

The present invention relates to a method and an arrangement in a Code Division Multiple Access (CDMA) communication network, and in particular to an arrangement allowing for optimizing of code utilization as well as a method for such optimization. The invention further relates to a computer-readable medium containing computer program for optimizing code utilization.

BACKGROUND OF THE INVENTION

Third-generation cellular telephony uses either Code Division Multiple Access (CDMA) for the radio interface or Time Division Multiple Access (TDMA). With CDMA, a user's information bits are spread over an artificially broadened bandwidth by multiplying them with a pseudorandom bit stream running several times as fast. The pseudorandom bit stream is known as a chipping or spreading code. The users occupy the same frequency bands at the same time, but each interaction is multiplied by a different spreading code and when the signals are de-spread, the only one that comes through intelligibly is the one whose code was used by the de-spreader. The others simply add to the background noise level.

The spreading function is applied in two phases. An initial channelization code spreading, determining the occupied bandwidth of the radio signal, is followed by a scrambling code spreading. The scrambling code is used to distinguish different user equipments at the base station's receiver and to distinguish multiple cell sites in the user equipment's receiver.

Thus, the signals transmitted in an exemplary CDMA system can be formed as follows. An information data stream to be transmitted is first multiplied with a channelization code and then the result is multiplied with a scrambling code. The multiplications are usually carried out by exclusive-OR operations, and the information data stream and the scrambling code may have the same or different bit rates. Each information data stream or channel is allocated a unique channelization code, and a plurality of coded information signals simultaneously modulates a radio-frequency carrier signal.

At a user equipment, such as a mobile station or other receiver, the modulated carrier signal is processed to produce an estimate of the original information data stream intended for the receiver. This process is known as demodulation. The composite received baseband spread signal is commonly provided to a rake processor that includes a number of "fingers", or de-spreaders, that are each assigned to respective ones of selected components, such as multipath echoes or images, in the received signal. Each finger combines a received component with the scrambling sequence and the channelization code so as to de-spread the received composite signal.

With the introduction of High Speed Downlink Packet Access (HSDPA) and increasing R99 Data Channel (DCH) traffic, the limiting factor in many cells is assumed to be the number of codes in the downlink code tree. HSDPA improves system capacity and increases user data rates in the downlink direction. Already with heavy packet traffic or in well-confined cells, it is believed that DCH traffic alone can reach code-limited scenarios and it becomes even worse when HSDPA is introduced.

To combat code limitation a number of actions may be taken. More carriers may be planned for; a higher order sectorization may also solve the problem. In addition, in the Third generation Partnership Project (3GPP) Release 6, a new channel, called Fractional Dedicated Physical Channel (F-DPCH), is introduced to share codes among HSDPA data-only users for a more efficient management of codes. However, without RBS/site impacts, the only solution is to deploy a secondary scrambling code A secondary scrambling code (or several secondary scrambling codes) pushes the code limitation away, but there is also a negative effect: an increase of the intra-cell interference due to non-orthogonality.

With a secondary scrambling code, the downlink transmission is already from the beginning non-orthogonal, meaning that the downlink transmission will consume more power to combat the interference from other scrambling codes than the case that if they are from the same scrambling code. Consequently, a code shortage problem could potentially, as soon as the secondary scrambling code is activated, become an equally large power shortage problem. Studies show that a secondary scrambling code becomes applicable in some scenarios but degrades the performance in other scenarios.

SUMMARY OF THE INVENTION

Accordingly, it is an objective with the present invention to provide an improved method for optimizing code utilization in a code division multiple access (CDMA) communication network comprising a first communication network entity, a second communication network entity connected to said first communication network over a communication interface and one or more user equipments transmitting data using a scrambling code to said second communication network entity over a radio interface on an uplink channel.

A further objective with the present invention is to provide an improved arrangement for optimizing code utilization in a code division multiple access (CDMA) communication network comprising a first communication network entity, a second communication network entity connected to said first communication network over a communication interface and one or more user equipments transmitting data using a scrambling code to said second communication network entity over a radio interface on an uplink channel.

A still further objective with the present invention is to provide an improved computer-readable medium for optimizing code utilization in a code division multiple access (CDMA) communication network comprising a first communication network entity, a second communication network entity connected to said first communication network over a communication interface and one or more user equipments transmitting data using a scrambling code to said second communication network entity over a radio interface on an uplink channel.

Further embodiments are listed in the dependent claims.

Thanks to the provision of a method and an arrangement of how to introduce a secondary scrambling code and in what scenario, an optimization of code and power resources is obtained, where available measurements and information at the radio base station, such as the channel dispersive statistics, current downlink power and traffic class, is fully utilized. The method and arrangement are simple and easy to implement in products without the need of changing standard.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF PREFERRED EMBODIMENTS

Figure 1:
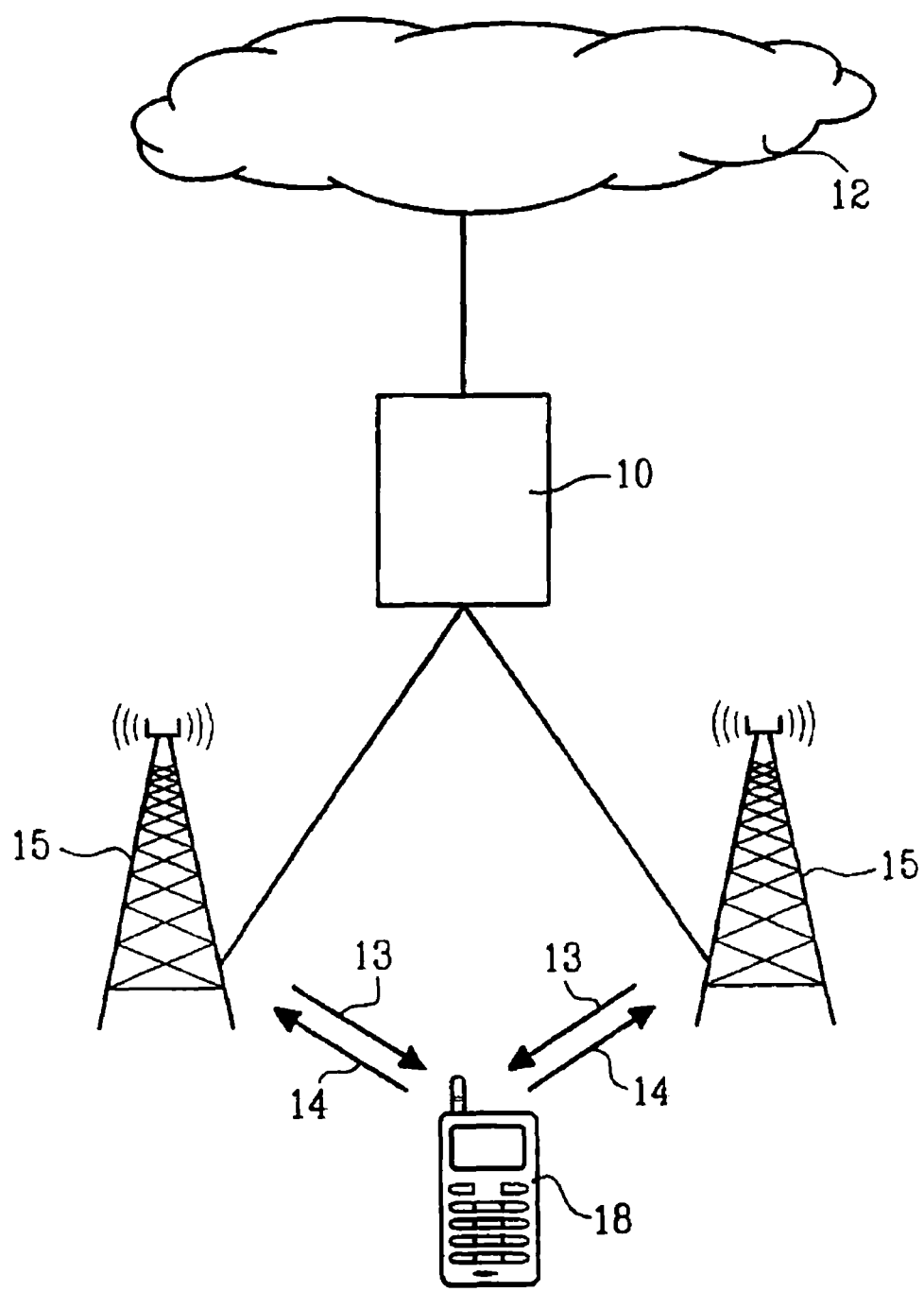
FIG. 1 shows the communication network architecture according to the present invention.

FIG. 1 depicts a communication system, such as a WCDMA communication system, including a Radio Access Network (RAN), such as the UMTS Terrestrial Radio Access Network (UTRAN) architecture, comprising at least one Radio Base Station (RBS) (or Node B) 15 connected to one or more Radio Network Controllers (RNCs) 10. The RAN is connected to a Core network (CN) 12. The RAN and the CN 12 provide communication and control for a plurality of user equipments (UE) 18 (only one is shown in FIG. 1), that each uses downlink (DL) channels 13 (i.e. base-to-user or forward) and uplink (UL) channels 14 (i.e. user-to-base or reverse). On the downlink channel 13, the RBS 15 transmits to each user equipment 18 at respective power level, and the signals transmitted by the RBS 15 are spread using orthogonal code words. On the uplink channel 14, the user equipments 18 transmit data to the RBS 15 at respective power level. According to a preferred embodiment of the present invention, the communication system is herein described as a WCDMA communication system. The skilled person, however, realizes that the inventive method and arrangement works very well on all CDMA communications system, such as CDMA2000® and cdmaOne™.

Radio environments can be classified to different types, e.g., Typical Urban, Rural Area, Sub Urban, Pedestrian, etc. and they can also be characterised by some measurements, e.g., channel orthogonality, root-mean-square (RMS) delay spread, coherence bandwidth, DL transmit code power variance, etc.

Study results show that there are some gains in terms cell throughput and the number of active users from using a secondary scrambling code in Pedestrian and Rural area environment but no gain in Typical Urban due to a bad orthogonality. Therefore, identifying the type of a radio environment (Typical Urban like or Pedestrian like or indoor like, etc.) will facilitate in introducing a secondary scrambling code. For instance, the orthogonality factor can be used to identify the radio environment type because different environments have different orthogonality.

Figure 2:
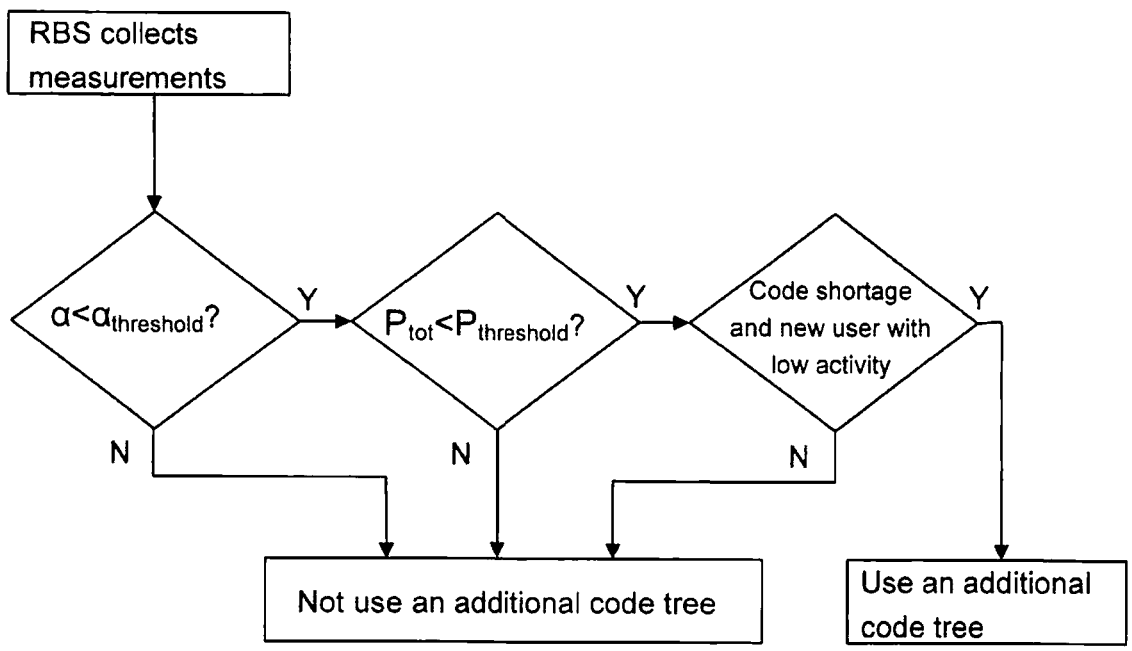
FIG. 2 shows how the inventive method is used in a radio base station.

In a preferred embodiment of the present invention, the procedure in a CDMA communication network for optimizing code utilization in the CDMA communication network comprising a first communication network entity, such as the RNC 10, a second communication network entity, such as the RBS 15, connected to said first communication network entity over a communication interface and one or more user equipments 18 transmitting data using a scrambling code to said second communication network entity 15 over a radio interface on an uplink channel, shown in FIG. 2, is as follows:

Firstly, measurements are preferably made at the RBS 15 based on the received uplink signal, whereby statistics of the whole cell radio environment based on the made and reported measurements is obtained (either in the RBS or in the RNC) and, thus what type of radio environment the one or more user equipments 18 are in is identified. Measurements may also be made in the UE, but this is explained in more detailed further below;

Secondly, a traffic activity over the radio interface is measured. The traffic activity is measured by setting a DL total power threshold $P_{threshold}$ and channel statistics threshold (e.g. $\alpha_{threshold}$), these thresholds may be fixed or adaptive according to the network status. As a new user requesting service with high activity will consume relatively more power than with low activity, it is necessary to take the traffic activity into account as well when introducing a secondary scrambling code. This is further discussed below;

Thirdly, when and how to use a secondary scrambling code is determined based on the identified type of radio environment and traffic activity. This is also discussed in greater detail below.

In a first preferred embodiment of the invention, in what type of radio environment the one or more user equipments 18 are is identified by making an uplink estimation in the RBS 15. This means that the RBS 15 gets the statistics for the whole cell based on the received uplink signal. Below is an example of how to estimate the orthogonality factor, $\hat{\alpha}$, in the RBS. The instantaneous orthogonality factor is quite different even for a UE. The RBS collects the orthogonality measurements from all the active radio links in the cell and uses a suitable performance measure such as average, xth percentile etc. of the measurements to identify the channel environment. This can be performed either during the network planning phase or during the network operation phase, then using the orthogonality factor statistics (average, xth percentile etc) to identify the type of the radio environment.

$$\hat{\alpha} = \frac{\text{Var}[\|\hat{H}(m)\|^2]}{\|E[\|\hat{H}(m)\|^2]\|^2}, \hat{H}(m) = DFT(\hat{h}(n), 2L_{\hat{h}} - 1) \quad (1)$$

$$\hat{h}(n) = \sqrt{p_{pilot}} \cdot h(n) + e(n) \quad (2)$$

Where h(n) is the instantaneous complex impulse response of the multi-path channel, $p_{pilot}$ is the dedicated pilot power, e(n) is the received noise and interference, $L_{\hat{h}}$ is the estimated number of rays. DFT denotes Discrete Fourier Transform, Var denotes the variance of the variable, and E denotes the expectation of the variable.

Alternatively, RMS delay spread or coherence bandwidth can be used for radio environment statistics to depict channel dispersive behaviour. Delay spread is the time between the first and last received signal component of the transmitted pulse during which the multipath signal power falls below some threshold relative to the strongest signal component. Coherence bandwidth is the measure of the range of frequencies over which the channel passes all the frequency components with approximately equal gain and linear phase shift.

In a second preferred embodiment of the invention, in what type of radio environment the one or more user equipments 18 are is identified by making a downlink estimation in the UE 18. Similarly to the uplink estimation in the RBS, the UE(s) may get the statistics by using the above described estimation methods such as orthogonality, RMS delay spread, coherence bandwidth etc and report these measurements to the network on periodic or event triggered basis or whenever requested by the network. Based on the measurement reports from all UEs in the cell some post processing can be done at the network (RNC or RBS) to get the cell level statistic (average, xth percentile etc). One advantage with a downlink based measurement is that there is more pilot information to measure on resulting in better accuracy. This requires, however, new measurements, RRC signalling and possibly reporting events to be defined in 3GPP.

In a third preferred embodiment of the invention, in what type of radio environment the one or more user equipments 18 are is identified by making a downlink estimation in the RBS 15, where an estimate of the downlink orthogonality factor can be achieved from transmitted code power variance. The downlink code power variance is more correlated to the orthogonality than the shadow fading. A larger variance is a strong indication of better orthogonality. Since the downlink code power mostly follows the Transmit Power Control (TPC) bits received from the UE the orthogonality can also be estimated by analysing TPC bit sequences. Both downlink code power and TPC bits are available at the RBS without any need for standard change.

Thus, the type of radio environment may be identified by using the orthogonality factor, the coherence bandwidth, the RMS delay spread or the DL transmit power variance. The type of radio environment may also be identified by using a combination of two or more of these measures.

The information of traffic activity is available in the RBS. The traffic activity is classified in 8 classes, i.e., Flow class (0 ... 7), 3GPP Rel. 7. "Flow classes" is a terminology used by the "An Evolved QoS Concept for 3GPP Rel. 7" team. The traffic activity is identified e.g. by using quality or service parameters or by measuring fraction of used transmission slots (Transmission Time interval (TTI)). The traffic activity may also be identified by measuring the average transmission slot utilization, i.e. average bits per transmission slots divided by maximum bits per transmission slot, or by measuring average transmitted code power. It is also possible to identify the traffic activity by using a combination of two or more above mentioned measures.

When the type of radio environment is identified and the traffic activity is measured, a decision of how and when to use a secondary scrambling code is done. If the orthogonality factor is used the decision is based on the following (as seen in FIG. 2): If and only if $\hat{\alpha}<\alpha_{threshold}$ & $P_{tot}<P_{threshold}$, for those users with low activity, for instance, only Flow class 6 or 7 (one type of interactive services and background respectively), a secondary scrambling code will be used in the case of code shortage.

The inventive arrangement according to the preferred embodiment of the present invention for optimizing code utilization in a CDMA communication network comprising a first communication network entity, such as the RNC 10, a second communication network entity, such as the RBS 15 connected to said first communication network entity over a communication interface and one or more user equipments 18 transmitting data using a scrambling code to said second communication network entity 15 over a radio interface on an uplink channel, thus comprises:

means for identifying in what type of radio environment said one or more user equipments are;
means for measuring a traffic activity over the radio interface;
means for determining when and how to use a secondary scrambling code based on the type of radio environment and traffic activity.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the present invention for optimizing code utilization in a code division multiple access (CDMA) communication network comprising a first communication network entity (10), a second communication network entity (15) connected to said first communication network entity over a communication interface and one or more user equipments (18) transmitting data using a scrambling code to said second communication network entity (15) over a radio interface on an uplink channel, is provided wherein the computer program performs the steps of:

identifying in what type of radio environment said one or more user equipments are;
measuring a traffic activity over the radio interface;
determining when and how to use a secondary scrambling code based on the type of radio environment and traffic activity.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

The particular embodiments described above are merely illustrative and should not be considered restrictive in any way. The scope of the invention is determined by the following claims, and all variations and equivalents that fall within the range of the claims are intended to be embraced therein.

The invention claimed is:

1. A method for optimizing code utilization in a code division multiple access (CDMA) communication network, said network comprising a first communication network entity and a second communication network entity connected to said first communication network entity over a communication interface, wherein one or more user equipments can transmit data using a scrambling code to said second communication network entity over a radio interface on an uplink channel, said method comprising the steps of:
- identifying in what type of radio environment said one or more user equipments are by estimating an orthogonality factor and using at least one of the following: Root-Mean-Square delay spread, coherence bandwidth and downlink transmit power variance;
- measuring traffic activity over the radio interface by measuring at least two of the following: average transmission slot utilization, fraction of used transmission slots, and average transmitted code power;
- determining when and how to use a secondary scrambling code based on the type of radio environment and traffic activity; and
- wherein the secondary scrambling code is used if the following criteria are satisfied:
  - the orthogonality factor is below an orthogonality threshold;
  - total downlink power is less than a downlink power threshold; and
  - the measured traffic activity is low.

2. The method according to claim 1, wherein the orthogonality factor is estimated in the second communication network entity by collecting measurements on the uplink channels from the user equipments.

3. The method according to claim 2, wherein the second communication network entity reports said uplink measurements to the first communication network entity, whereby the first communication network entity can identify said radio environment.

4. The method according to claim 1, wherein the orthogonality factor is estimated in the user equipments by downlink measurements.

5. The method according to claim 3, wherein the user equipments report said downlink measurements to the second communication network entity, whereby the second communication network entity can identify said radio environment.

6. The method according to claim 5, wherein the user equipments periodically report said downlink measurements to the second communication network entity.

7. The method according to claim 5, wherein the user equipments report said downlink measurements to the second communication network entity on an event triggered basis.

8. The method according to claim 5, wherein the user equipments report said downlink measurements to the second communication network entity whenever requested by the CDMA communication network.

9. The method according to claim 1, wherein the orthogonality factor is estimated in the second communication network entity on the downlink channel.

10. The method according to claim 9, wherein the second communication network entity reports said downlink measurements to the first communication network entity, whereby the first communication network entity can identify said radio environment.

11. An arrangement for optimizing code utilization in a code division multiple access (CDMA) communication network, said network comprising a first communication network entity and a second communication network entity connected to said first communication network entity over a communication interface, wherein one or more user equipments can transmit data using a scrambling code to said second communication network entity over a radio interface on an uplink channel, wherein the arrangement comprises:
- processing circuitry configured to identify in what type of radio environment said one or more user equipments are, said processing circuitry configured to estimate an orthogonality factor and identify the type of radio environment using at least one of the following:
  - Root-Mean-Square delay spread,
  - coherence bandwidth and
  - downlink transmit power variance;
- said processing circuitry configured to measure traffic activity over the radio interface by measuring at least two of the following:
  - average transmission slot utilization,
  - fraction of used transmission slots, and
  - average transmitted code power;
- said processing circuitry configured to determine when and how to use a secondary scrambling code based on the type of radio environment and traffic activity; and
- wherein the secondary scrambling code is used if the following criteria are satisfied:
  - the orthogonality factor is below an orthogonality threshold;
  - total downlink power is less than a downlink power threshold; and
  - the measured traffic activity is low.

12. The arrangement according to claim 11, wherein the second communication network entity is arranged to estimate the orthogonality factor by collecting measurements on the uplink channels from the user equipments.

13. The arrangement according to claim 12, wherein the second communication network entity is further arranged to report said uplink measurements to the first communication network entity, whereby the first communication network entity can identify said type of radio environment.

14. The arrangement according to claim 11, wherein the user equipments are arranged to estimate the orthogonality factor by downlink measurements.

15. The arrangement according to claim 14, wherein the user equipments are arranged to report said downlink measurements to the second communication network entity, whereby the second communication network entity can identify said type of radio environment.

16. The arrangement according to claim 15, wherein the user equipments are arranged to periodically report said downlink measurements to the second communication network entity.

17. The arrangement according to claim 15, wherein the user equipments are arranged to report said downlink measurements to the second communication network entity on an event triggered basis.

18. The arrangement according to claim 15, wherein the user equipments are arranged to report said downlink measurements to the second communication network entity whenever requested by the CDMA communication network.

19. The arrangement according to claim 11, wherein the second communication network entity is arranged to estimate the orthogonality factor on a downlink channel.

20. The arrangement according to claim 19, wherein the second communication network entity is arranged to report said downlink measurements to the first communication network entity, whereby the first communication network entity can identify said type of radio environment.

* * * * *